F. H. VAN HOUTEN.
DOUGH PROVING CABINET.
APPLICATION FILED APR. 7, 1913.
1,115,621. Patented Nov. 3, 1914.
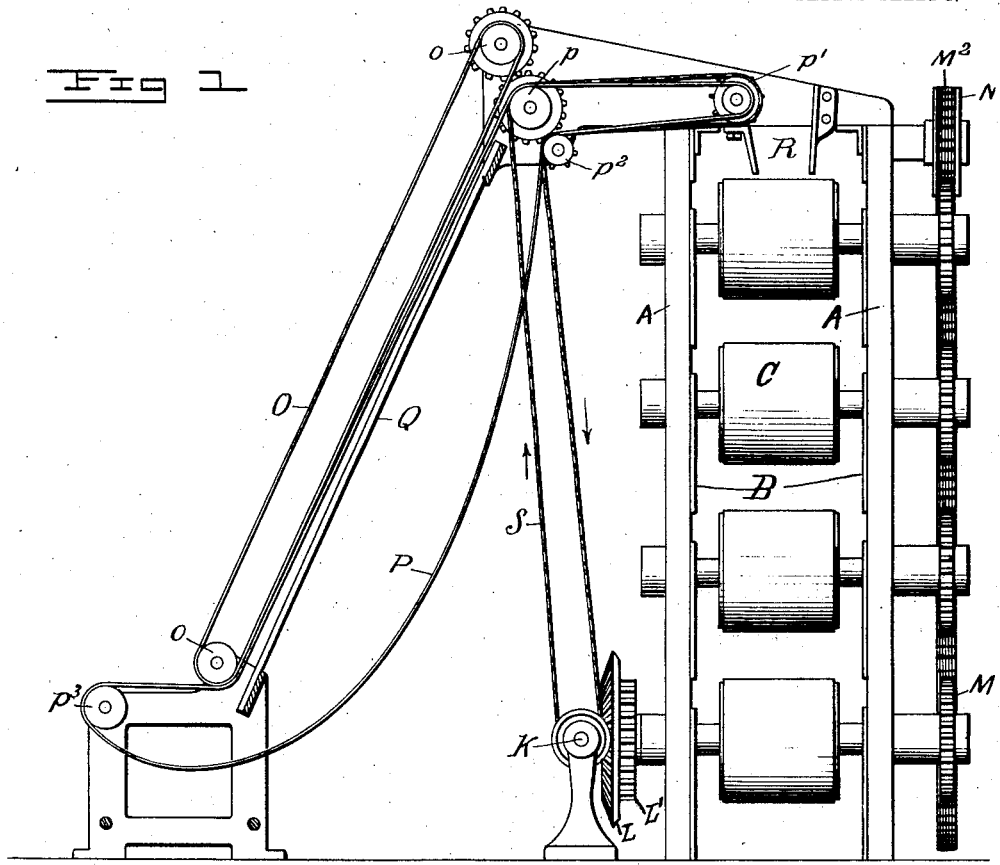
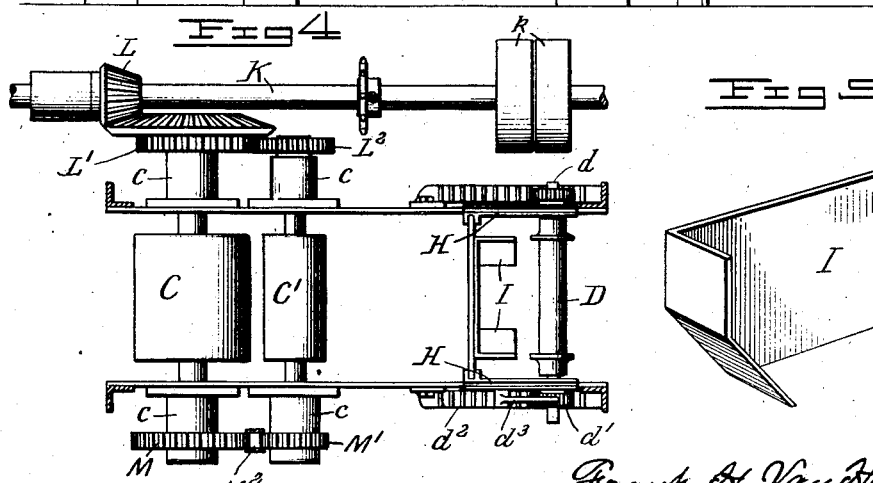
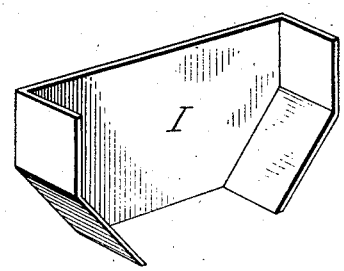
Inventor
Frank H. Van Houten

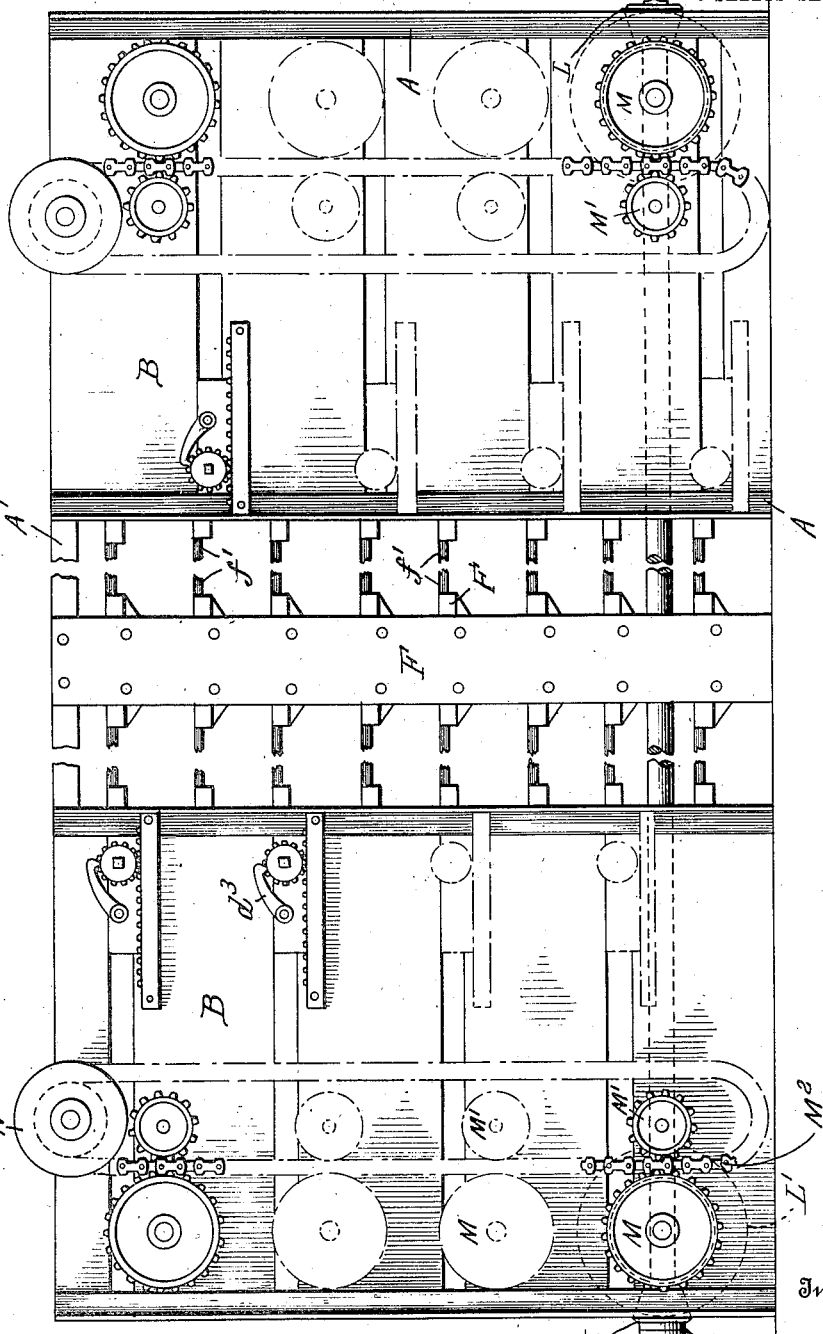

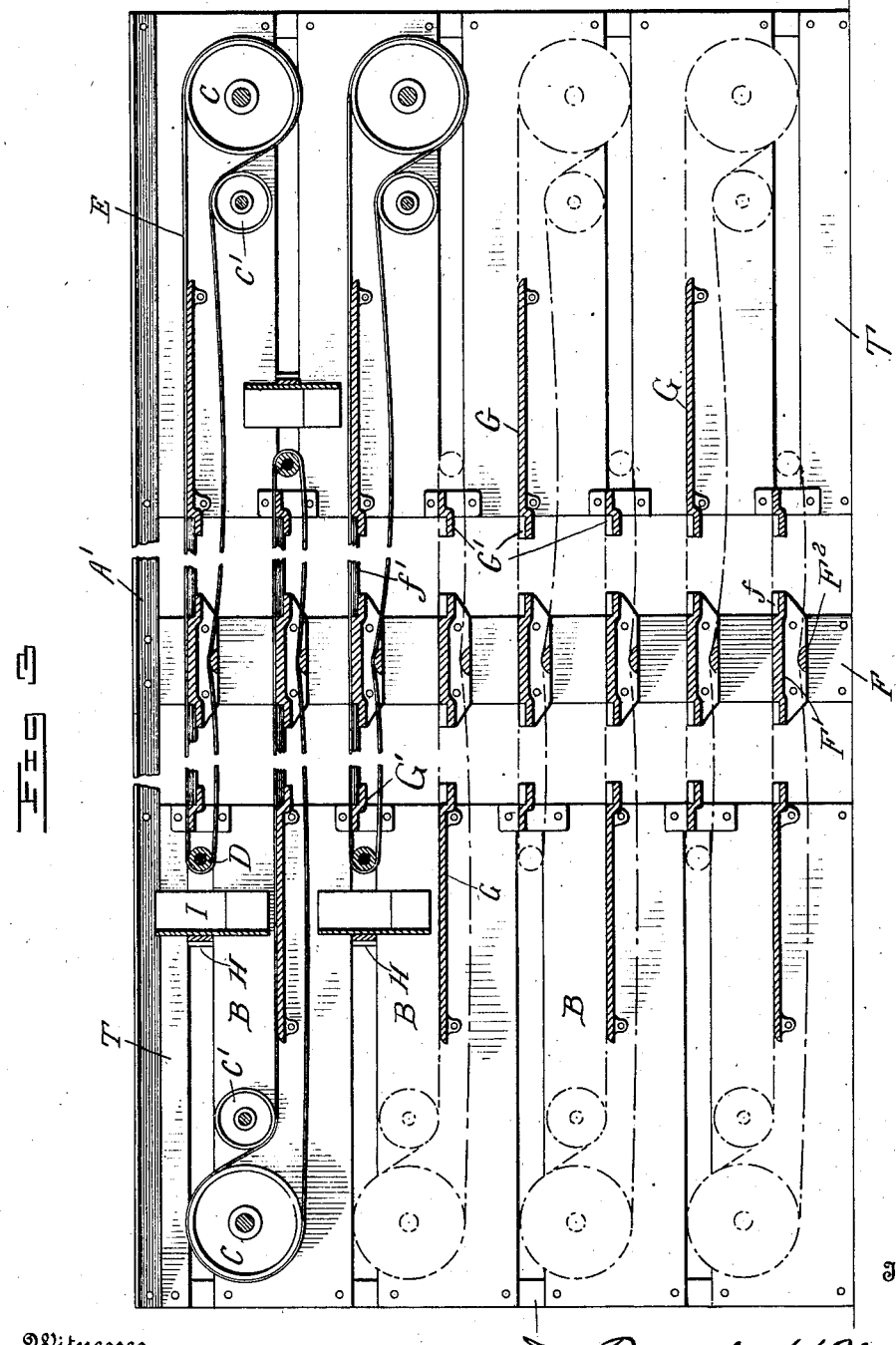

UNITED STATES PATENT OFFICE.

FRANK H. VAN HOUTEN, OF FISHKILL-ON-THE-HUDSON, NEW YORK.

DOUGH-PROVING CABINET.

1,115,621.  Specification of Letters Patent.  Patented Nov. 3, 1914.

Application filed April 7, 1913. Serial No. 759,541.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Dough-Proving Cabinets; and I do hereby declare the following to be a full, clear, and exact description of the same, reference being had to the accompanying drawings, forming part of this specification, and to the figures and letters of reference marked thereon.

This invention relates to dough proving cabinets, objects of the invention being to provide a structure primarily composed of a series of units and sections which may be combined to form a proving cabinet of practically any size and capacity to suit the available space in which it is to be located, thus avoiding to a large extent the necessity of designing cabinets for each particular situation.

A further object of the invention is to provide a proving cabinet which is formed by substantially duplicate units and sections reversely arranged with respect to each other at opposite ends of the cabinet, whereby the cost of production may be reduced and the assembling of the parts simplified both in manufacture and in setting up the cabinet for use.

A further object of the invention is to provide a construction in which the carrying belts will occupy a minimum vertical space and permit of the introduction of a greater number of belts in a cabinet of given height, and at the same time insure a proper and uniform driving of the belt, regardless of their length.

Another object of the invention is to provide a proving cabinet in which all of the carrying belts will invariably receive a uniform movement both as to the time and distance of travel, and with which the power for operating one belt will not be transmitted through the immediate driving connections of the other belts.

The invention consists in the construction and arrangement of the parts to be hereinafter described and pointed out particularly in the appended claims.

Referring to the accompanying drawings,—Figure 1 is an end elevation with parts in section of a proving cabinet embodying the present improvements with the inclosing casing omitted. Fig. 2 is a side elevation with portions broken away and some of the duplicate parts indicated in dotted lines, of the mechanism shown in Fig. 1, with the exception of the dough elevating devices. Fig. 3 is a section in a vertical longitudinal plane, the point of view being substantially the same as the point of view in Fig. 2. Fig. 4 is a detail sectional view in a horizontal plane through the mechanism at one end of the cabinet, but omitting the dough carrying belt. Fig. 5 is a detail perspective of one of the funnels through which the dough is discharged from one belt to another.

Like letters of reference in the several figures indicate the same parts.

Generally speaking, a proving cabinet, constructed in accordance with the present invention, embodies a vertical series of dough carrying belts arranged to transport the dough back and forth from one end to the other of the cabinet, each higher belt being arranged to discharge the dough onto the next lower belt, whereby the dough will gradually travel from the top to the bottom of the cabinet, and the successive belts, including their supporting and driving mechanism, are practical duplicates of each other, but reversely arranged. As the most economical and convenient method of manufacturing and assembling the parts the belt driving and supporting mechanism at each end of the cabinet is formed in separate and substantially duplicate units each embodying duplicate sections, as many or few of which may be employed as may be necessary to give the desired capacity or to fill the available vertical space in the apartment or room in which the cabinet is located. Inasmuch as the invention is designed for variation of the capacity of the cabinet, either vertically or horizontally, the units at the ends of the cabinet are made relatively short and intermediate units are supplied for supporting the dough carrying belts between the end units, with the result that where desired the cabinet may be as long as is necessary to obtain the desired capacity or to fill the available space, without regard to the vertical height or number of belts employed.

The several units and sections are connected and held in their proper relative positions by bars, preferably of angle iron, and referring to the drawings, A, A indicate vertically arranged angle iron bars at the corners of each of the end units of the cabinet, and A', A' are horizontally arranged angle iron bars connecting the several units of the cabinet. The angle iron bars in effect form a skeleton framework which may be readily cut from stock material to suit desired or necessary dimensions for the available space.

Each of the end units of the cabinet embodies a series of duplicate sections each formed by side plates B fastened at the ends to the vertical corner irons A, the plates of adjacent sections being separated somewhat from each other for a purpose to be presently explained.

The side plates of each section are located opposite each other and each is provided with bearings c in which the shafts of the belt rollers C, C' are journaled. The bearings c are preferably located in the same relative positions in all of the plates or sections formed by the plates, whereby the plates may be utilized for either of the end units of the cabinet by a simple reversal, and consequently the plates and rollers may be all duplicates and as many or few are employed as found necessary to give the desired capacity or to fill the available space in which the cabinet is to be located.

The spaces between the adjacent edges of the plates or sections are preferably utilized to receive the bearings for rollers D over which the carrying belts travel; thus, in the preferred arrangement of belts, each belt E at one end of the cabinet, say the right hand end in Figs. 2 and 3, passes around the roller C, and is guided over the upper portion or top of the roller C', the opposite end of the belt passing around the guide roller D held in bearings between adjacent sections at the opposite end of the cabinet. The belts at the latter end of the cabinet may be similarly arranged, but are preferably passed around the rollers C and under or below the rollers C', extending thence to the other end portion of the cabinet and around a roller D.

The top reaches of the belts are, of course, the reaches upon which the dough is conveyed back and forth, and these reaches of the belts are preferably supported on shelf-like supports extending substantially throughout the portion upon which the dough is deposited and conveyed. Obviously, where the cabinet is a long one, provision must be made for intermediate units more or less in number between the end units of the cabinet, and in the preferred construction illustrated the intermediate units or sections are composed of vertical side pieces F connected at their upper ends with the angle bars A' and supporting between them bracket or shelf castings F' having at their upper edges or corners seats f for removable shelves f'. The opposite ends of the shelves f' are adapted to rest in similar seats either on other intermediate unit supports or on corresponding supports on the end units of the cabinet. As shown in Fig. 3, it will be noted that the end units are provided with relatively long shelf-like supporting portions G having seats corresponding to the seats f before referred to, and adjacent to the rollers D they are provided with short shelf-supporting members G' also having seats corresponding to the seats f. The supports G, G' are fastened in position by bolts or rivets passing through the plates B and, in some instances, through the angle irons A, but in the preferred construction the bolt or rivet holes in the plates are similarly positioned in all of the plates so as to facilitate duplication and to permit of the parts being assembled on the unit and section system before referred to. The supports G serve to connect the side plates B in a more or less rigid manner, and it is obvious that the said supports G may be inverted so as to bring their belt supporting surfaces uppermost when the sections are to be reversed top for bottom and end for end when used at opposite ends of the cabinet.

While any preferred arrangement of belt tightener rollers may be employed and located at any desired point in the length of the under reach of the belt, it is preferred that the rollers D be made adjustable for the purpose of tightening the belts or maintaining their tension and to accomplish this the said rollers are journaled on shafts d mounted in bearings H slidable in the ways formed by the proximate edges of the plates B, and as a convenient means for adjusting and retaining the adjustment of the rollers, the ends of the shafts are squared and provided with pinions d' adapted to mesh in racks $d^2$ secured to the side plates B. A pawl $d^3$, Figs. 2 and 4, will serve to maintain the pinions, shafts and rollers with their bearings in adjusted position, and it is therefore a comparatively simple matter to rotate the shafts and pinions by a suitable wrench so as to tighten the belt to the desired degree, and by means of the pawl retain it at its adjusted tension.

The bearings H above referred to, also serve as a convenient means for supporting the funnel I adapted to guide the lumps of dough in dropping from the higher to the lower belt and to center the dough on the lower belt. To support the under reaches of the belts during their return to the rollers C and C' the intermediate supports F are provided with cross pieces $F^2$ over which the belts travel, said cross pieces being preferably flat on the under side so as to give all the clearance possible above the next lower belt and are rounded on their upper surface to give a smooth supporting face over which the belts may travel without undue friction or wear. The arrangement of the supports F′ and F², it will be noted, retains the reaches of the belt close together and leaves the largest possible space in the passageways through which the dough travels on the belts, thus conserving to a material degree the vertical space required for the installation.

For driving the belts, a drive shaft K is journaled in suitable bearings in proximity to one side of the cabinet and receives its power through fast and loose pulleys $k$ which may be located at any point in the length of the shaft. The shaft usually extends from end to end of the cabinet, but, of course, this is a mere matter of mechanical detail and serves through beveled gears L to rotate the lower rollers C. The shafts of the rollers C, which are rotated directly from the shaft K, are provided with gear wheels L′ meshing with gear wheels L² on the shafts of the adjacent rollers C′, the gears being proportioned to impart to the rollers C and C′ the same peripheral speed. The shafts of all of the rollers C and C′ at their opposite ends from the shaft K are provided with gear wheels M and M′, respectively, spaced away from each other, but the gear wheels of the several sections at each end of the cabinet are located in vertical alinement, and power is transmitted from one section to the other by means of a flexible rack M². As shown particularly in Fig. 2, the flexible rack travels between and meshes with the gear wheels M and M′ and at its upper end travels loosely over a smooth sheave or pulley N having suitable end flanges for guiding the rack. At its lower end the flexible rack forms a pendent loop, and the whole arrangement is such that by the rotation of the shafts of the lowermost rollers C and C′, the power is transmitted through the flexible rack directly to each of the other pairs of rollers C and C′ at that end of the cabinet, whereby resistance to the travel of any one belt does not increase the strain on the driving gears of another belt, and the gears may be made relatively light and adapted simply for driving a single belt. It is found that this arrangement requires the expenditure of very much less power than is required for operating a series of belts where a train of gearing is employed.

Obviously, the dough may be deposited on the topmost belt by any suitable means, but in Fig. 1 a tried and perfected means is illustrated. Referring to this figure, it will be noted that at one side of the cabinet there is located a dough elevator which consists essentially of a belt O mounted in inclined position and traveling on top and bottom pulleys or rollers $o$. A second belt P extends partly around the lower roller or pulley $o$, thence upwardly over a roller or pulley $p$, thence around a pulley $p'$ and pulley $p^2$, thence downwardly in a long loose loop to a pulley $p^3$, located in front of the lower roller $o$. Immediately behind the upwardly traveling reach of the belt P there is mounted a supporting incline Q for partially supporting the weight of dough which is being carried up between the belt. The pulley $p'$ is located over the cabinet and the dought is adapted to be discharged through a funnel or guide R from the belt as the latter passes around the pulley $p'$. Motion is imparted to the elevator belts preferably by a chain S driven from the shaft K and traveling around sprocket wheels on the shafts of the rollers $p$, $p'$ and $p^2$, the upper roller $o$ being driven by gear wheels from the shaft of the roller $p$.

In operation, lumps of dough from the dividing machine or from any suitable source are deposited on the belt P between the rollers $p^3$ and $o$ and are carried rearwardly until gripped between the belts, thence upwardly while still held between the belts, and at the upper end of the elevator they are carried rearwardly and dropped into the proving cabinet at a suitable point on the topmost belt. The lumps of dough are carried by the top belt to the farther end, dropped to the next lower belt and so on down through the cabinet itself, being finally discharged through any suitable opening or onto any suitable conveyer ready for further manipulation or baking.

With the construction described it will be noted that the cabinet is built up of units and sections, both longitudinally and vertically and it becomes possible to vary the dimensions in either direction by simply increasing or decreasing the number of sections or units employed. The end portions or units of the cabinet are both formed of similar sections reversed in their relation to each other, or turned end for end, and the construction is such that no additional other pieces are required, save narrow side pieces T located at the top and bottom of one or the other end portion of the cabinet to fill the narrow spaces which would otherwise be left at the top at one end and at the bottom at the other end when the sections are so disposed that the dough carrying reaches of one belt extend in a plane which is substantially intermediate the sections at the opposite end of the cabinet as, for example, in passing around rollers D which are located between the sections, as before described.

Having thus described my invention what I claim as new and desire to secure by Letters Patent of the United States, is:

1. A dough proving cabinet embodying duplicate reversely arranged end units with a vertically arranged series of horizontal carrying belts extending between said end portions, each of said end portions being formed by a vertical series of individual duplicate sections each embodying a pair of side plates, belt guiding and driving rollers, and belt supports for the carrying reaches of the belts.

2. A dough proving cabinet formed of longitudinal units whereby the length of the cabinet may be varied in accordance with the number of units employed, the end units of the cabinet being reversely arranged with relation to each other and both formed of individual duplicate sections mounted one above the other and each section embodying a pair of side plates with belt guiding and driving rollers journaled in said plates, and belts extending from one end unit to the other.

3. A dough proving cabinet formed of end and intermediate units, the end units embodying a series of duplicate sections arranged one above the other, each having dough carrying belt guiding and driving rollers mounted therein, and the intermediate units embodying a corresponding vertical series of belt guides and supports with removable shelves forming belt supports between the end and intermediate units.

4. A dough proving cabinet embodying reversely arranged end units each formed by a vertical series of individual duplicate sections spaced apart vertically and having carrying belt guiding and driving rollers journaled therein, belt guiding rollers adjustably mounted in the spaces between the sections, whereby the tension on the belts may be regulated, and dough carrying belts passing around said rollers and arranged in vertical series to discharge the dough from one to the other.

5. A dough proving cabinet embodying reversely arranged end units, each formed by a series of individual duplicate sections arranged one above the other vertically and separated one from the other, belt guiding and driving rollers journaled in each section, adjustable belt tightener rollers, bearings in which the tightener rollers are mounted, located between and adjustably guided by the proximate edges of the sections, and dough conveying belts passing around said rollers and arranged in vertical series to discharge the dough from one to the other.

6. A dough proving cabinet embodying end and intermediate units, the end units being reversely arranged and formed by a vertical series of individual duplicate sections with the sections in one end unit reversed with relation to the sections in the other end unit, said sections in each unit being arranged in vertical series and each embodying belt guiding and driving rollers and dough conveying belts extending from the guiding and driving pulleys in one end unit to the opposite end unit, said belts being arranged in vertical series to discharge the dough from one to the other.

7. In a dough proving cabinet, the combination with vertically arranged corner bars, of a series of sections arranged one above the other on said corner bars and each embodying a pair of separate side plates rigidly connected with the corner bars, dough conveying belt guiding and driving rollers journaled in bearings on said plates, and dough guiding rollers journaled in bearings mounted between the edges of adjacent plates of the sections.

8. In a dough proving cabinet, the combination with the vertical supporting bars, of a series of plates secured at their ends to said supporting bars in parallel planes with their edges spaced apart, shaft bearings mounted on said plates, belt guiding and driving rollers mounted on shafts journaled in said bearings, and belt guiding rollers journaled in bearings mounted between the proximate edges of the plates, of dough carrying belts passing around said guiding and driving rollers and arranged in vertical series to discharge one onto the other, and drive gearing for said driving rollers, substantially as described.

9. In a dough proving cabinet, the combination of end units each embodying vertically arranged supporting bars and horizontally extending side plates arranged in separate pairs forming duplicate sections one above the other and reversed with relation to each other in the respective units, each pair of side plates being provided with horizontal shaft bearings, belt guiding and driving rollers mounted on shafts journaled in said bearings, adjustable belt guiding rollers journaled in bearings supported between the adjacent edges of proximate plates, and means for holding said adjustable rollers in adjusted position for maintaining the tension on the belts.

10. In a dough proving cabinet, the combination of end units formed of duplicate but reversely arranged sections spaced apart vertically, each section embodying belt guiding and driving rollers for one end of the dough carrying belt, belt guiding rollers mounted between the sections of the opposite unit for the opposite end of said belt, belt supports intermediate the end units, and belt supporting shelves between the end units and intermediate supports.

11. In a dough proving cabinet, the combination with end units each formed by a vertical series of duplicate sections each section having belt driving and guiding rollers and a belt support having a shelf seat thereon, guiding rollers mounted in bearings intermediate the sections of each unit for the discharge end of the belts driven from the opposite end unit, and intermediate shelves mounted on said seats for supporting the carrying reaches of the belts intermediate the units.

12. In a dough proving cabinet, the combination with the end units formed of a vertical series of duplicate sections embodying belt guiding and driving rollers and belt supports, vertical bars on which said sections are mounted, intermediate sections embodying side pieces and horizontally arranged belt supports and belt supporting shelves bridging the spaces between the intermediate and end belt supports.

FRANK H. VAN HOUTEN.

Witnesses:
CLAUDE VAN NOSTRAN,
WILLIAM T. STRIPPEL.